United States Patent
Rea et al.

(10) Patent No.: US 8,450,965 B2
(45) Date of Patent: May 28, 2013

(54) STACK-POWERED FUEL CELL MONITORING DEVICE WITH PRIORITIZED ARBITRATION

(75) Inventors: David D. Rea, Pittsford, NY (US);
Michael F. Zawisa, Victor, NY (US);
Kenneth L. Kaye, Fairport, NY (US);
Robert S. Foley, Rochester, NY (US)

(73) Assignee: GM Global Technology Operations LLC, Detroit, MI (US)

( * ) Notice: Subject to any disclaimer, the term of this patent is extended or adjusted under 35 U.S.C. 154(b) by 378 days.

(21) Appl. No.: 12/840,047

(22) Filed: Jul. 20, 2010

(65) Prior Publication Data

US 2012/0019255 A1    Jan. 26, 2012

(51) Int. Cl.
*H01M 10/44* (2006.01)
*H02J 7/00* (2006.01)

(52) U.S. Cl.
USPC ............ 320/101; 320/104; 320/138; 320/139

(58) Field of Classification Search
USPC .......................................................... 320/101
See application file for complete search history.

(56) References Cited

U.S. PATENT DOCUMENTS

| | | | | |
|---|---|---|---|---|
| 5,369,353 A | * | 11/1994 | Erdman | 323/207 |
| 5,820,172 A | * | 10/1998 | Brigham et al. | 290/40 C |
| 5,898,282 A | * | 4/1999 | Drozdz et al. | 318/139 |
| 5,929,594 A | * | 7/1999 | Nonobe et al. | 320/104 |
| 6,455,180 B1 | * | 9/2002 | Mowery et al. | 429/432 |
| 6,580,977 B2 | * | 6/2003 | Ding et al. | 701/22 |
| 6,672,415 B1 | * | 1/2004 | Tabata | 180/65.25 |
| 7,132,822 B1 | * | 11/2006 | Breitlow et al. | 324/142 |
| 7,692,400 B2 | * | 4/2010 | Kanouda et al. | 320/101 |
| 2005/0118472 A1 | * | 6/2005 | Yang et al. | 429/23 |
| 2006/0210853 A1 | * | 9/2006 | Fukuda | 429/23 |
| 2007/0292724 A1 | * | 12/2007 | Gilchrist | 429/9 |

* cited by examiner

*Primary Examiner* — Yalkew Fantu
(74) *Attorney, Agent, or Firm* — John A. Miller; Miller IP Group, PLC

(57) ABSTRACT

A system that monitors fuel cells in a fuel cell group. The system includes a plurality of voltage sensors coupled to the fuel cells in the fuel cell group, where each sensor monitors a different voltage of the fuel cells and where lower priority voltage sensors monitor higher voltages and higher priority sensors monitor lower voltages. The system also includes a plurality of oscillators where a separate oscillator is coupled to each of the sensors. Each oscillator operates at a different frequency where higher frequency oscillators are coupled to lower priority sensors and lower frequency oscillators are coupled to higher priority sensors. A light source that receives frequency signals from the oscillators and switches on and off in response to the frequency signals. A light pipe receives the switched light signals from the light source and provides light signals at a certain frequency at an end of the light pipe.

18 Claims, 1 Drawing Sheet

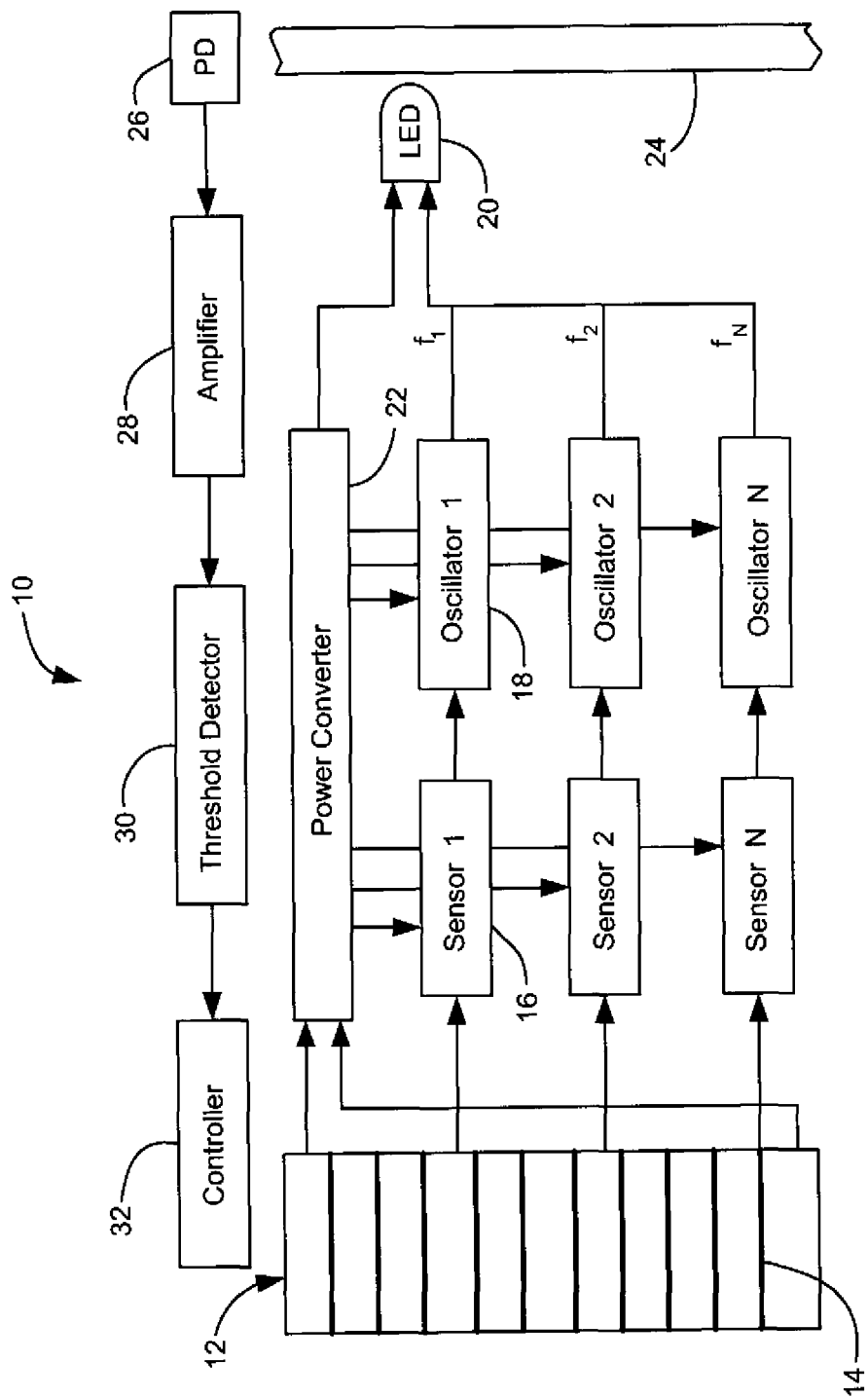

STACK-POWERED FUEL CELL MONITORING DEVICE WITH PRIORITIZED ARBITRATION

BACKGROUND OF THE INVENTION

1. Field of the Invention

This invention relates generally to a system for monitoring low performing fuel cells in a fuel cell stack and, more particularly, to a system for monitoring low performing fuel cells in a fuel cell stack where the system includes sensors for detecting a certain condition of the fuel cells, such as voltage sensors, and where the sensed signal operates an oscillator whose oscillation frequency is determined by the severity of the sensed condition.

2. Discussion of the Related Art

Hydrogen is a very attractive fuel because it is clean and can be used to efficiently produce electricity in a fuel cell. A hydrogen fuel cell is an electro-chemical device that includes an anode and a cathode with an electrolyte therebetween. The anode receives hydrogen gas and the cathode receives oxygen or air. The hydrogen gas is dissociated in the anode to generate free protons and electrons. The protons pass through the electrolyte to the cathode. The protons react with the oxygen and the electrons in the cathode to generate water. The electrons from the anode cannot pass through the electrolyte, and thus are directed through a load to perform work before being sent to the cathode.

Proton exchange membrane fuel cells (PEMFC) are a popular fuel cell for vehicles. The PEMFC generally includes a solid polymer electrolyte proton conducting membrane, such as a perfluorosulfonic acid membrane. The anode and cathode typically include finely divided catalytic particles, usually platinum (Pt), supported on carbon particles and mixed with an ionomer. The catalytic mixture is deposited on opposing sides of the membrane. The combination of the anode catalytic mixture, the cathode catalytic mixture and the membrane define a membrane electrode assembly (MEA). MEAs are relatively expensive to manufacture and require certain conditions for effective operation.

Several fuel cells are typically combined in a fuel cell stack by serial coupling to generate the desired power. For example, a typical fuel cell stack for a vehicle may have two hundred or more stacked fuel cells. The fuel cell stack receives a cathode input reactant gas, typically a flow of air forced through the stack by a compressor. Not all of the oxygen is consumed by the stack and some of the air is output as a cathode exhaust gas that may include water as a stack by-product. The fuel cell stack also receives an anode hydrogen reactant gas that flows into the anode side of the stack. The stack also includes flow channels through which a cooling fluid flows.

The fuel cell stack includes a series of bipolar plates positioned between the several MEAs in the stack, where the bipolar plates and the MEAs are positioned between the two end plates. The bipolar plates include an anode side and a cathode side for adjacent fuel cells in the stack. Anode gas flow channels are provided on the anode side of the bipolar plates that allow the anode reactant gas to flow to the respective MEA. Cathode gas flow channels are provided on the cathode side of the bipolar plates that allow the cathode reactant gas to flow to the respective MEA. One end plate includes anode gas flow channels, and the other end plate includes cathode gas flow channels. The bipolar plates and end plates are made of a conductive material, such as stainless steel or a conductive composite. The end plates conduct the electricity generated by the fuel cells out of the stack. The bipolar plates also include flow channels through which a cooling fluid flows.

As a fuel cell stack ages, the performance of the individual cells in the stack degrade differently as a result of various factors. There are different causes of low performing cells, such as cell flooding, loss of catalyst, etc., some temporary and some permanent, some requiring maintenance, and some requiring stack replacement to exchange those low performing cells. Although the fuel cells are electrically coupled in series, the voltage of each cell when a load is coupled across the stack decreases differently where those cells that are low performing have lower voltages. Thus, it is necessary to monitor the cell voltages of the fuel cells in a stack to ensure that the voltages of the cells do not drop below a predetermined threshold voltage to prevent cell voltage polarity reversal, possibly causing permanent damage to the cell.

Typically, the voltage output of every fuel cell in a fuel cell stack is monitored so that the system knows if a fuel cell voltage is too low, indicating a possible failure. As is understood in the art, because all of the fuel cells are electrically coupled in series, if one fuel cell in the stack fails, then the entire stack will fail. Certain remedial actions can be taken for a failing fuel cell as a temporary solution until the fuel cell vehicle can be serviced, such as increasing the flow of hydrogen and/or increasing the cathode stoichiometry.

Fuel cell voltages are often measured by a cell voltage monitoring sub-system that includes an electrical connection to each bipolar plate, or some number of bipolar plates, in the stack and end plates of the stack to measure a voltage potential between the positive and negative sides of each cell. Therefore, a 400 cell stack may include 401 wires connected to the stack. Because of the size of the parts, the tolerances of the parts, the number of the parts, etc., it may be impractical to provide a physical connection to every bipolar plate in a stack with this many fuel cells, and the number of parts increases the cost and reduces the reliability of the system.

As discussed above, it is known in the art to process the electric signals of the fuel cells in a fuel cell stack to determine whether the fuel cell stack is functioning as desired. Often, electric signal processing is done every other cell because of the costs associated with monitoring every cell. Furthermore, it can be difficult to provide the necessary components in the space available to monitor every cell. In order to eliminate the necessity to connect fuel cell measurement circuits to a fuel cell stack using a plurality of interconnecting wires, it is desirable to embed such measurement circuits directly within the structure of the fuel cell stack assembly. Such an embedded measurement circuit would not add significant costs, and would allow for every fuel cell to be monitored.

SUMMARY OF THE INVENTION

In accordance with the teachings of the present invention, a system is disclosed that monitors fuel cells in a fuel cell group. The system includes a plurality of voltage sensors coupled to the fuel cells in the fuel cell group, where each sensor monitors a different voltage of the fuel cells and where lower priority voltage sensors monitor higher voltages and higher priority sensors monitor lower voltages. The system also includes a plurality of oscillators where a separate oscillator is coupled to each of the sensors. Each oscillator operates at a different frequency where higher frequency oscillators are coupled to lower priority sensors and lower frequency oscillators are coupled to higher priority sensors. The system also includes a light source, such as an LED, that receives frequency signals from the oscillators where the light source switches on and off in response to the frequency signals and where lower frequency signals dominate the switching of the light source. A light pipe receives the switched light signals from the light source and provides light signals at a certain frequency at an end of the light pipe. A photodetector detects the light signals at the end of the light pipe.

Additional features of the present invention will become apparent from the following description and appended claims, taken in conjunction with the accompanying drawings.

BRIEF DESCRIPTION OF THE DRAWING

FIG. 1 is a schematic block diagram of a system for detecting fuel cell operation and conditions of fuel cells in a fuel cell group.

DETAILED DESCRIPTION OF THE EMBODIMENTS

The following discussion of the embodiments of the invention directed to a system for monitoring the operation of fuel cells in a fuel cell group using sensors and oscillators is merely exemplary in nature, and is in no way intended to limit the invention or its applications or uses.

FIG. 1 is a schematic block diagram of a system 10 for monitoring the performance of a group of fuel cells, such as a fuel cell stack 12, including series coupled fuel cells 14. In this non-limiting embodiment, the system 10 monitors the performance of about sixteen of the fuel cells 14 as a representative example. A fuel cell stack for a vehicle application may have 400 or more fuel cells where several of the systems 10 would be required to monitor the performance of all of the fuel cells in the stack. The number of fuel cells that the system 10 monitors is application and design specific and is not intended to limit the invention, as discussed herein.

The system 10 includes a plurality of sensors 16 that monitor the operation of the fuel cells 14. The present invention contemplates any type of sensor suitable for the purposes discussed herein. In one embodiment, the sensors 16 are voltage sensors that measure the voltage of the fuel cells 14. However, other types of sensors, such as temperature sensors, humidity sensors, high frequency resistance (HFR) sensors, etc., may be employed within the scope of the present invention. When the voltage of the fuel cell 14 drops below some predetermined value, then the sensor 16 will provide an output signal. For reasons that will become apparent from the discussion below, each of the sensors 16 provides an output signal in response to detecting a certain condition of the fuel cells 14 in the stack 12. The sensors 16 can be coupled to one or more of the fuel cells 14 in any desirable design configuration.

In one non-limiting embodiment, each of the sensors 16 is coupled to each of the fuel cells 14 for detecting low cell voltages of all of the fuel cells 14. Each of the sensors 16 would have a different threshold where sensor 1 may be calibrated to detect potentially low performing cells, sensor 2 may be calibrated to detect lower performing cells and sensor N may detect cell reversal. Each of the sensors 16 would output a control signal based on that detection so that the output of the system 10, discussed below, will cause a system controller 32 to perform certain remedial operations depending on which sensor is providing the signal. For example, if sensor 1 provides an output signal indicating a potentially low performing cell, then the control signal from the system 10 may cause the system controller 32 to provide more reactant gas flow, increase cathode humidity, etc. However, if one of the other sensors 16 provides an output signal, then the system controller 32 may perform more drastic control operations, such as shutting the system down, to prevent stack damage. In this manner, the sensors 16 detect higher priority changes or possible failures of the fuel cells 14 in the stack 12 in some order, where in this design sensor 1 provides an output signal for the lowest priority potential failure and sensor N provides an output signal for the highest priority fuel cell failure. How the system 10 distinguishes from multiple outputs from the sensors 16 will become apparent from the discussion below.

In the embodiment discussed above, the sensors 16 are coupled to each of the fuel cells 14 in the stack 12. In alternate embodiments, different sensor configurations and designs can be provided where the sensors 16 may be coupled to different ones of the fuel cells 14, which may provide a different cell performance identification, such as being connected to end cells only. Although the embodiment shown includes three sensors, any number of sensors can be employed that are suitable for the purposes discussed herein and any number of fuel cells can be provided in the fuel cell group 12.

In one embodiment, the sensors 16 are embedded within the fuel cell stack 12. U.S. patent application Ser. No. 12/707,572, filed Feb. 17, 2010, titled Plate Interconnect Method for an Imbedded Fuel Cell Sensor, assigned to the assignee of this application and herein incorporated by reference, discloses an embedded fuel cell sensor of this type.

Each sensor 16 controls an oscillator 18 that operates at a different frequency $f$. The frequency of the oscillators 18 is selected so that as the sensor 16 identifying a higher priority cell failure or potential cell failure operates an oscillator 18 at a lower frequency than the previous sensor 16 whose priority is lower. Therefore, in this example, oscillator 1 has a frequency $f_1$ that is higher than a frequency $f_2$ from oscillator 2 and a frequency $f_N$ from oscillator N, oscillator 2 has the frequency $f_2$ that is lower than the frequency $f_1$ and higher than the frequency $f_N$ and oscillator N has the frequency $f_N$ that is lower than the frequencies $f_1$ and $f_2$.

The frequency outputs from the oscillators 18 are sent to a light emitting diode (LED) 20. When the LED 20 receives a signal from an oscillator 18 it will turn on and turn off at that oscillator's frequency. The frequencies $f_1$, $f_2$ and $f_N$ operate as an electrical logical OR input to the LED 20 where the lowest frequency signal dominates the higher frequency signals. Particularly, as the LED 20 is turned on and off, its rate of switching will be controlled by the lower frequency signal because the higher frequency signals will cause the LED 20 to switch during times when the LED 20 is on as a result of the lower frequency signal. Therefore, although the LED 20 may be receiving frequency signals from all of the oscillators 18, if the oscillator N is providing a signal, that frequency will control the operation of the LED 20 so that higher priority potential failure mode will be identified.

The system 10 also includes a power converter 22 that provides a stable power output signal to the sensors 16, the oscillators 18 and the LED 20. The power converter 22 receives a voltage signal from the fuel cell stack 12 and conditions the voltage signal to be a continuous stable output power signal for the sensors 16, the oscillators 18 and the LED 20. The power converter 22 uses the power generated by the fuel cells 14 that are the fuel cells that are being monitored for potential problems. Therefore, the voltage provided by the fuel cells 14 may vary in response to the cell performance where the power converter 22 may need to boost the power or reduce the power for the sensors 16, the oscillators 18 and the LED 20.

Light from the LED 20 is coupled into a side of a light pipe 24 of a type well known to those skilled in the art. Therefore, an optical signal is provided on the light pipe 24 at an on/off frequency depending on which of the oscillators 18 is being operated, as discussed above. The light from the light pipe 24 is detected by a photodetector 26 that provides a voltage signal at the frequency that the light is being provided by the light pipe 24. The single light pipe 24 can be used for all of the systems 10 that may be monitoring a particular fuel cell stack. For example, if several systems 10 are being used to monitor predetermined groups of fuel cells in the fuel cell stack, then the light pipe 24 may receive signals from several LEDs, one for each of the systems 10. In the same manner that each LED 20 uses the lower frequency electrical signal from the oscillators 18 to control the on/off switching of the LED 20, the LED 20 with the lower switching frequency will dominate the frequency of the switching of the light in the light pipe 24. For example, if one LED 20 is outputting light at a frequency set by $f_1$ and another LED 20 is outputting light at a frequency set by $f_N$, then the system 10 that was operating at the frequency $f_N$ would dominate the light detection of the photodetector 26 so that the highest priority potential failure in the entire stack would be detected. Thus, the light pipe 24 provides an optical logical OR using the light from each of the systems 10. In one non-limiting embodiment, the light pipe 24 can be threaded through datum holes in the stack structure that were used to align the cells in the stack during compression and sealing of the stack, as would be well understood to those skilled in the art.

The voltage signal from the photodetector 26 is amplified by an amplifier 28. The amplified signal from the amplifier 28 is then sent to a threshold detector 30 that makes sure that the light detected by the photodetector 26 exceeds some predetermined threshold. Generally, all of the light received by the photodetector 26 will come from the light pipe 24. However, there may be certain times when the light pipe or the photodetector 26 captures extraneous light, which is not from the LED 20. Those signals are prevented from being processed by the threshold detector 30. The signals from the photodetector 26 that pass the threshold detector 30 are then received by the system controller 32 that determines the frequency of the signal being received and what response is necessary to address system concerns based on that frequency.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A system for monitoring fuel cells in a fuel cell group, said system comprising:
   a plurality of sensors coupled to the fuel cells in the fuel cell group, each sensor monitoring a different condition of the fuel cells, said sensors being prioritized where lower priority sensors detect lower priority conditions and higher priority sensors detect higher priority conditions;
   a plurality of oscillators where a separate oscillator is coupled to each of the sensors, each oscillator operating at a different frequency where higher frequency oscillators are coupled to lower priority sensors and lower frequency oscillators are coupled to higher priority sensors;
   a light source receiving frequency signals from the oscillators, said light source switching on and off in response to the frequency signals where lower frequency signals dominate the switching of the light source; and
   a light pipe receiving switched light signals from the light source and providing switched light signals at an end of the light pipe.

2. The system according to claim 1 further comprising a photodetector for detecting the light signals provided at the end of the light pipe, an amplifier for amplifying voltage signals from the photodetector and a threshold detector receiving the amplified voltage signals from the amplifier, said threshold detector passing voltage signals that exceed a predetermined threshold.

3. The system according to claim 1 where the sensors are voltage sensors for measuring the voltage of the fuel cells.

4. The system according to claim 3 wherein lower priority voltage sensors detect higher cell voltages and higher priority voltage sensors detect lower voltages.

5. The system according to claim 1 further comprising a power converter, said power converter being powered by the fuel cells that are being monitored, said power converter providing a conditioned power signal to the sensors, the oscillators and the light source.

6. The system according to claim 1 wherein the sensors are selected from the group consisting of temperature sensors, humidity sensors and high frequency resistance sensors.

7. The system according to claim 1 wherein the fuel cell group is one group of a plurality of fuel cell groups in a fuel cell stack where each fuel cell group includes a system for monitoring the fuel cells in that group, said light pipe receiving switched light signals from light sources in all of the fuel cell groups where light signals having a lower switching frequency dominate in the light pipe.

8. The system according to claim 1 wherein the light source is a light emitting diode.

9. The system according to claim 1 wherein each of the sensors monitors the condition for each of the fuel cells.

10. A system for monitoring fuel cells in a fuel cell group, said system comprising:
    a plurality of voltage sensors coupled to the fuel cells in the fuel cell group, each voltage sensor monitoring a different voltage of the fuel cells where voltage sensors that monitor lower voltages are higher priority sensors and sensors that monitor higher voltage are lower priority sensors;
    a plurality of oscillators where a separate oscillator is coupled to each of the sensors, each oscillator operating at a different frequency where higher frequency oscillators are coupled to lower priority sensors and lower frequency oscillators are coupled to higher priority sensors;
    a light emitting diode receiving frequency signals from the oscillators, said light emitting diode switching on and off in response to the frequency signals where lower frequency signals dominate the switching of the light emitting diode;
    a light pipe receiving switched light signals from the light emitting diode and providing switched light signals at an end of the light pipe; and
    a photodetector for detecting the light signals provided at the end of the light pipe, said photodetector providing voltage signals in response to the switched light signals.

11. The system according to claim 10 further comprising an amplifier for amplifying the voltage signals from the photodetector and a threshold detector receiving the amplified voltage signals from the amplifier, said threshold detector passing voltage signals that exceed a predetermined threshold.

12. The system according to claim 10 further comprising a power converter, said power converter being powered by the fuel cells that are being monitored, said power converter providing a conditioned power signal to the sensors, the oscillators and the light source.

13. The system according to claim 10 wherein the fuel cell group is one group of a plurality of fuel cell groups in a fuel cell stack, where each fuel cell group includes a system for monitoring the fuel cells in that group, said light pipe receiving switched light signals from light sources in all of the fuel cell groups where light signals having a slower switching frequency dominate in the light pipe.

14. The system according to claim 10 wherein each of the voltage sensors monitors the voltage for each of the fuel cells.

15. A system for monitoring fuel cells in a fuel cell group, said system comprising:
  a plurality of voltage sensors coupled to the fuel cells in the fuel cell group, each voltage sensor monitoring a different voltage of the fuel cells where lower priority sensors monitor higher voltage and higher priority sensors monitor lower voltages;
  a plurality of oscillators where a separate oscillator is coupled to each of the sensors, each oscillator operating at a different frequency where higher frequency oscillators are coupled to lower priority sensors and lower frequency oscillators are coupled to higher priority sensors;
  a light emitting diode receiving frequency signals from the oscillators, said light emitting diode switching on and off in response to the frequency signals where lower frequency signals dominate the switching of the light emitting diode;
  a light pipe receiving switched light signals from the light emitting diode and providing switched light signals at an end of the light pipe;
  a photodetector for detecting signals provided at the end of the light pipe and providing switched voltage signals; and
  a power converter, said power converter being powered by the fuel cells that are being monitored, said power converter providing a conditioned power signal to the sensors, the oscillators and the light emitting diode.

16. The system according to claim 15 further comprising an amplifier for amplifying the voltage signals from the photodetector and a threshold detector receiving the amplified voltage signals from the amplifier, said threshold detector passing voltage signals that exceed a predetermined threshold.

17. The system according to claim 15 wherein the fuel cell group is one group of a plurality of fuel cell groups in a fuel cell stack where each fuel cell group includes a system for monitoring the fuel cells in that group, said light pipe receiving switched light signals from light sources in all of the fuel cell groups where light signals having a slower switching frequency dominate in the light pipe.

18. The system according to claim 15 wherein each of the sensors monitors the voltage for each of the fuel cells.

* * * * *